United States Patent
Krishnan et al.

(10) Patent No.: US 6,606,710 B2
(45) Date of Patent: Aug. 12, 2003

(54) ADAPTIVE RE-ORDERING OF DATA PACKET FILTER RULES

(75) Inventors: P. Krishnan, Matawan, NJ (US); Danny Raz, Aberdeen, NJ (US); Binay Sugla, Aberdeen, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 10/179,460

(22) Filed: Jun. 24, 2002

(65) Prior Publication Data

US 2003/0051165 A1 Mar. 13, 2003

Related U.S. Application Data

(63) Continuation of application No. 09/204,464, filed on Dec. 3, 1998, now abandoned.

(51) Int. Cl.[7] .................................................. G06F 11/30
(52) U.S. Cl. ...................................... 713/201; 713/200
(58) Field of Search ................................ 713/200, 201, 713/202, 207

(56) References Cited

U.S. PATENT DOCUMENTS

| | | | |
|---|---|---|---|
| 4,964,119 A | 10/1990 | Endo et al. ..................... 370/60 |
| 5,493,689 A | 2/1996 | Waclawsky et al. ......... 395/821 |
| 5,832,482 A | 11/1998 | Yu et al. ........................ 707/6 |
| 5,848,393 A | 12/1998 | Goodridge et al. ............. 705/8 |
| 5,999,923 A | 12/1999 | Kowalski et al. ............. 706/47 |
| 6,009,475 A | 12/1999 | Shrader ....................... 709/249 |
| 6,038,596 A | 3/2000 | Baldwin et al. ............. 709/219 |
| 6,041,347 A | 3/2000 | Harsham et al. ............. 709/220 |
| 6,219,786 B1 | 4/2001 | Cunningham et al. ....... 713/152 |

FOREIGN PATENT DOCUMENTS

EP 0661847 A 7/1994 ........... H04L/12/26

OTHER PUBLICATIONS

William R. Cheswick and Steven M. Bellovin, Firewalls and Internet Security Repelling the Wily Hacker, Chapter 3, pp. 51–83, Addison–Wesley Publishing Company 1994.

*Primary Examiner*—Norman Michael Wright
(74) *Attorney, Agent, or Firm*—Jeffrey M. Weinick

(57) ABSTRACT

A packet data filter which stores ordered rules and sequentially applies the rules to received data packets to determine the disposition of the data packet. The packet filter maintains a match count in memory which indicates the number of times each rule matched an incoming data packet. Periodically, at the initiation of a user, or based on operating parameters of the filter, the rules are automatically re-ordered based on the match count. As a result of the re-ordering, rules with higher match counts are moved earlier in the sequential evaluation order and rules with lower match counts are moved later in the sequential evaluation order. As such, rules which are more likely to match incoming data packets are evaluated earlier, thus avoiding the evaluation of later rules. In order to prevent a re-ordering which would change the overall security policy of the packet filter, pairs of rules are compared to determine if they conflict (i.e., the swapping of the two rules would result in a change in the overall security policy). During re-ordering, the swapping of conflicting rules is prevented.

39 Claims, 3 Drawing Sheets

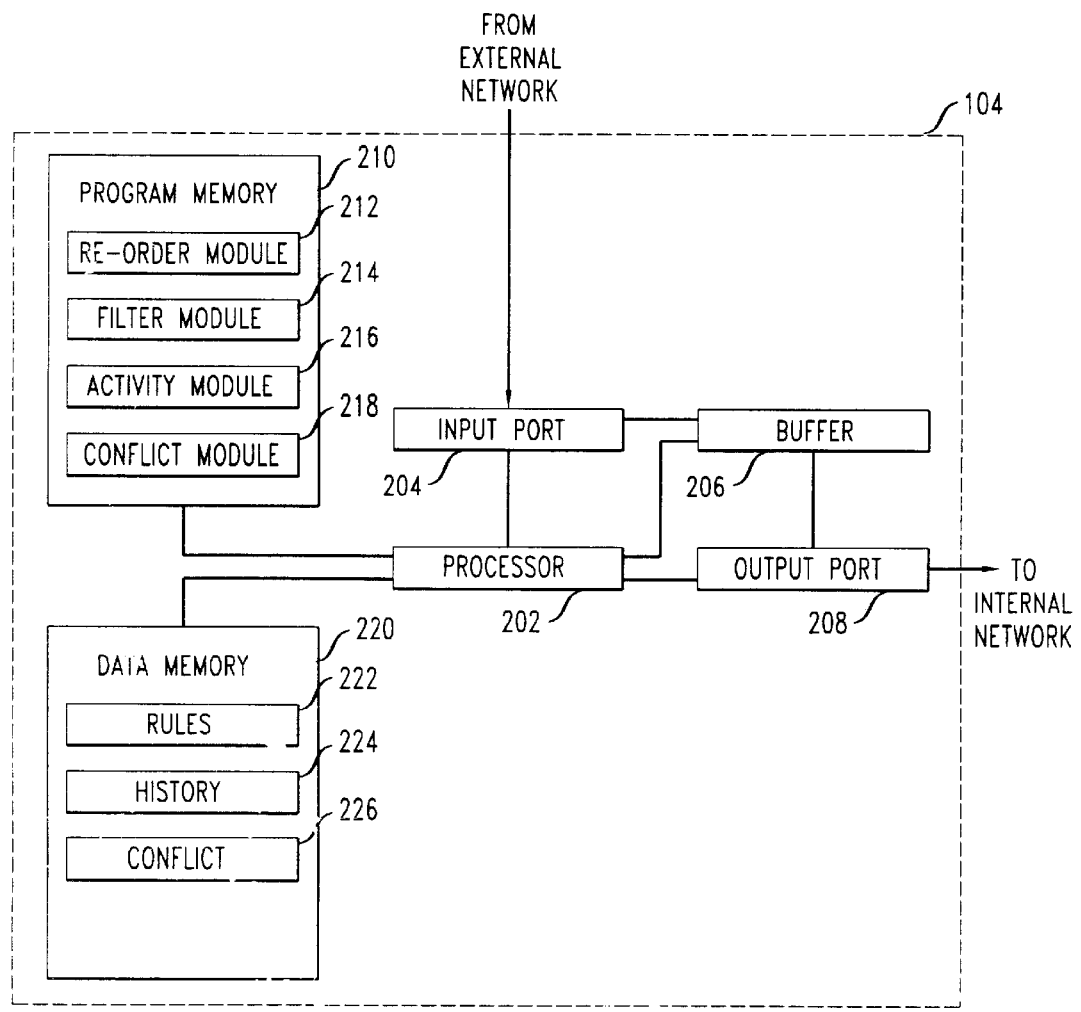

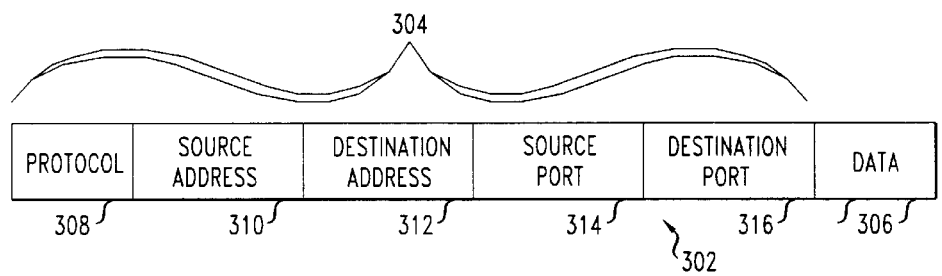

ADAPTIVE RE-ORDERING OF DATA PACKET FILTER RULES

This is a continuation of application Ser. No. 09/204,464 filed Dec. 3, 1998, now abandoned.

FIELD OF THE INVENTION

The present invention relates to data packet filters. More particularly, the present invention relates to adaptive re-ordering of data packet filter rules to improve the performance of the filter while maintaining a security policy.

BACKGROUND OF THE INVENTION

Data networks are becoming increasingly prevalent. For example, many companies have internal data networks to allow for intra-company communication. Such communication includes email, documents, voice, video, and multimedia. Further, these internal data networks are generally connected to an external data network (e.g. Internet), to allow for the exchange of information between the internal and external networks. However, as a result of the interconnection of data networks, security has become a major concern. The unauthorized access to a company's data network can result in the loss of valuable proprietary information. Further, unauthorized access can also result in attacks on the company's data network and computing system, resulting in loss of data and computer system crashes.

A computer programmed to implement a security policy for a data network is called a firewall. Typically, firewalls are located at strategic points in the network such that all incoming and outgoing data traffic must pass through a firewall. At these points, all network traffic is trapped and examined by the firewall to determine if the traffic should be allowed to pass through the firewall. There are various techniques for implementing a firewall. One such implementation is a computer programmed to implement a data packet filter. A data packet filter examines all received data packets, and either denies or allows passage of the data packet based on the contents of the data packet. In one implementation, this decision is based on rules stored in the data packet filter which define which data packets are allowed to pass and which data packets will be blocked. Each stored rule defines certain parameters of data packets (e.g. source and destination) and also includes the disposition of data packets which match these parameters. For example, a rule may indicate that any data packet from source X will be blocked, while another rule may indicate that any data packet from source Y to destination Z will be allowed to pass. The rules are stored in sequential order in the data packet filter and every data packet received by the firewall is tested against the rules in sequential order. The first rule whose parameters match the received packet is applied to the packet and the packet is treated as indicated by the rule.

In such a rules based data packet filter, a system administrator must first define a security policy to be implemented by the firewall, and then must program the data packet filter with rules which will implement that security policy. One major problem with these types of firewalls is that sophisticated security policies require a large number of rules in order to implement the policy. Since every data packet which passes through the firewall must be checked against these rules, the performance of the firewall degrades as the number of rules increases.

One known solution to the performance problem in a data packet filter firewall is to use a memory cache. In such a system, when a data packet arrives, the relevant parameters (e.g. source and destination) of the data packet are stored in a cache. In addition, after the packet filter rules have been applied to the received data packet, the disposition (e.g. allow or deny) is also stored in the cache associated with the relevant parameters of the received data packet. Thereafter, if a data packet is received with parameters which are the same as parameters previously stored in the cache, the firewall can apply the associated disposition without applying all the rules to the data packet. This enhances performance in view of the fact that for certain applications, ongoing communications will occur between two computers, and there is no need to check every data packet exchanged between the computers during the communication session (i.e., connection). Thus, while this technique improves performance for data packets exchanged during connections, the technique does not improve performance for new connections.

Packet filters may also be implemented on a client computer, for example a personal computer running World Wide Web (WW) browsing software (e.g., Microsoft Explorer or Netscape Navigator). Many WWW sites contain material which parents may deem unsuitable for children. As such, several companies offer filtering software which implements packet filters for blocking unsuitable material. These packet filters implement a security policy through the use of rules as described above. As the number of rules increases, these client based packet filters suffer from the same performance problems as described above.

What is needed is a technique for improving the performance of a data packet filter as the number of rules required to implement a security policy increases.

SUMMARY OF THE INVENTION

As described above, a data packet filter stores a plurality of ordered rules which are sequentially applied to received data packets to implement a security policy. In accordance with the invention, the rules are automatically re-ordered to improve the performance of the packet filter. Rules which match incoming data packets more frequently are moved earlier in the ordering, and rules which match incoming data packets less frequently are moved later in the ordering. Since the first rule that matches a received data packet controls the disposition of the packet, once a rule matches a packet, the remaining rules need not be evaluated. By re-ordering the rules, data packets are matched against rules more quickly, and the performance of the data packet filter is improved.

In one embodiment of the invention, the packet filter dynamically maintains, during operation of the packet filter, a count of the number of times each rule matches a received data packet. The packets are then re-ordered based on these counts with the rules having higher match counts being moved earlier in the rules order. Such re-ordering is made on the premise that past history of the packet filter provides a reliable indication of future operation. Thus, by dynamically maintaining match counts during operation, the packet filter can adaptively re-order its rules based on past operating parameters. Such adaptive re-ordering is beneficial to protect against so-called denial of service attacks, as described in further detail below.

In one embodiment of the invention, rules are re-ordered by swapping pairs of rules in the rules order. However, the sequence of the rules plays a part in defining the security policy of the packet filter. As such, the indiscriminate swapping of rules may result in changing the security policy of the packet filter. Such a result is undesirable and must be prevented. As such, rules are evaluated to determine re-orderings which are not allowed because they result in a change in the security policy. In one embodiment, such an evaluation is made by comparing pairs of rules to determine which pairs of rules conflict with each other. Two rules are said to conflict with each other if swapping the rules would result in changing the security policy of the packet filter. The result of this conflict evaluation is stored in the memory of the packet filter and subsequent re-ordering refers to this information in order to prevent the swapping of conflicting rules.

The re-ordering in accordance with the invention may be performed periodically, at the initiation of a user, or based on the some operating parameters of the packet filter (e.g. when the performance of the packet filter drops below a threshold).

The principles of the present invention may be applied to various types of computing devices. For example, and without limitation, the invention may be implemented in a dedicated network firewall which filters data packets for many computers and networks, or in a stand-alone personal computer such that the packet filter only filters data packets for the personal computer.

These and other advantages of the invention will be apparent to those of ordinary skill in the art by reference to the following detailed description and the accompanying drawings.

BRIEF DESCRIPTION OF THE DRAWINGS

FIG. 1 shows a network of the type in which the present invention may be implemented;

FIG. 2 shows a computer configured to implemented a firewall in accordance with the present invention;

FIG. 3 shows the format of an exemplary data packet;

FIG. 4 shows an example of a rule set;

FIG. 5 shows a conflict table; and

DETAILED DESCRIPTION

Figure 6:
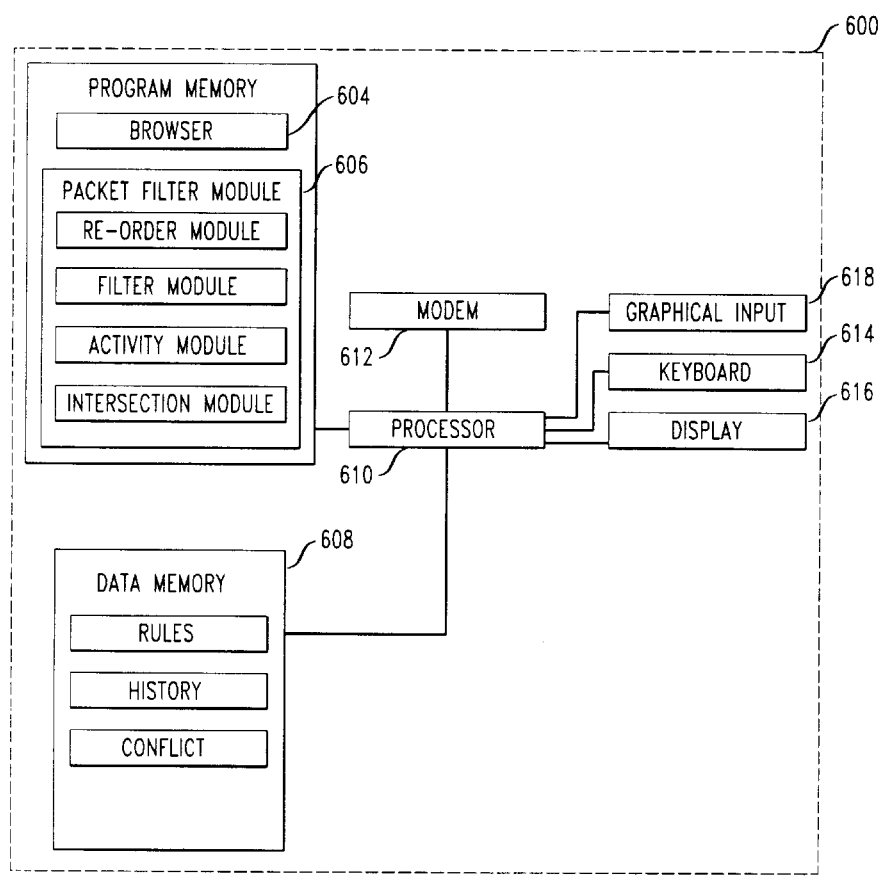
FIG. 6 shows a personal computer in which the principles of the present invention may be implemented.

A network of the type in which the present invention may be implemented is shown in FIG. 1. An internal data network, such as a corporate intranet, is shown as network 102. An external data network, such as the Internet, is shown as network 106. Firewall 104 is shown positioned such that all data traffic exchanged between internal network 102 and external network 106 must pass through the firewall 104. These data networks communicate with each other using the well known Internet Protocol (IP) for data packet communication. Assume that firewall 104 is administered by the same entity which administers internal network 102. The purpose of firewall 104 is to implement the security policy of the internal network 102.

The firewall 104 may be implemented by a properly configured computer, further details of which are shown in FIG. 2. FIG. 2 shows firewall 104 comprising a processor 202 which controls the overall operation of the firewall 104. Processor 202 is connected to input port 204, buffer 206, output port 208, program memory 210, and data memory 220. Program memory 210 and data memory 220 may be any type of well known computer storage device. In operation, processor 202 controls the operation of the firewall 104 by executing computer program instructions stored in program memory 210. Program memory 210 includes the following program modules: re-order module 212, filter module 214, activity module 216, and conflict module 218. These modules contain computer program code which, when executed by processor 202, implements a packet filter in accordance with the present invention. It is to be understood that the program modules shown in program memory 210 are high level representations of functional computer program modules. In various implementations, these modules could include program source code, object code, or a combination of source and object code. These modules will be discussed in further detail below. Of course, a computer implementing a firewall would have other well known components as well. Such other components are not shown in FIG. 2 for clarity.

The operation of firewall 104 is as follows. When a data packet is received at firewall 104 from external network 106, the data packet is received at input port 204. The format of an exemplary data packet 302 is shown in FIG. 3. Data packet 302 contains a header portion 304 and data portion 306. The header portion 304 contains the following fields: protocol 308, source address 310, destination address 312, source port 314, and destination port 316. The protocol field 308 indicates the protocol with which the current packet is being transmitted. For example, the protocol field 308 may indicate that the data packet 302 is being transmitted using the well known TCP/IP protocol. The source address 310 indicates the IP address of the source of the data packet 302. IP addressing is well known in data networking. IP addresses are 32 bits, and are most commonly represented in a dotted notation as 4 integers, each between 0 and 255, and each separated by a dot (e.g. 125.180.104.4). The destination address 312 indicates the IP address of the destination of the data packet 302. The source port 314 indicates the port number of the source computer. A port number is an integer between 0 and 65,535, and generally is associated with an application that runs on a particular machine. For example, web servers are typically associated with port number 80. The destination port 316 indicates the port number of the destination computer. The data portion 306 of the packet 302 contains the payload of the packet which will be used by an application executing on the destination computer.

Upon receipt of the data packet at input port 204, the data packet 302 is stored in buffer 206 while the processor 202 executes the filter module 214 in order to apply the filter rules 222 stored in data memory 220 against the received data packet. The filter module 214 applies the rules to the received data packet in sequential order. The first rule that matches the data packet is the rule which will decide whether the data packet is allowed or denied. Once a rule matches the data packet, there is no need to apply the remaining rules.

An example of a rule set which would be stored as rules 222 is shown in FIG. 4. As shown in FIG. 4, each rule has a sequence number, which indicates the order in which the rules will be applied against an incoming data packet. Each rule also has fields indicating protocol, source address, destination address, source port, destination port, and an action. Each rule indicates the action to be taken when a data packet is received which matches the information in the rule's fields. A packet is said to match the rule if the header information in the packet falls within the defined ranges of values in the above described fields. For example, rule number 1 indicates that any packet received using the TCP protocol with a source address of 125.30.20.200 is to be denied (i.e. blocked), regardless of the contents of the other fields of the packet. The "*" in a rule field indicates a wildcard which will match any value. Rule number 2 indicates that any packet received using the TCP protocol with a source address in the range 135.180.104.4 to 135.180.104.225, a destination address in the range 135.180.204.4 to 135.180.204.255, a source port in the range 1024–65535, and a destination port of 80 is to be allowed (i.e. passed to its destination). Rule number 3 indicates that any packet received using the TCP protocol from a source address in the range 125.180.100.0–125.180.100.255 is to be allowed, regardless of the values in the other fields. Finally, rule number 4 indicates that all data packets are to be denied. Since rules are applied in sequential order, rule number 4 will only be applied if none of the rules 1–3 match the incoming data packet. The inclusion of a rule such as rule number 4 is common practice in firewalls and implements a security policy that all packets are denied unless specifically allowed. As would readily be recognized by one skilled in the art, a wide variety of security policies may be implemented by storing different rule sets as rules 222 in data memory 220. It is also noted that the action indicated in a rule may be something other than allow or deny. For example, it is possible that an action indicates that packets matching the rule be forwarded to some other location for further processing.

Thus, while the received data packet is stored in buffer 206, processor 202 sequentially applies rules 222 to the data packet until a rule matches the data packet. If the matched rule indicates that the data packet is to be allowed, then the packet is transferred to output port 208 and is allowed to pass to the internal network 102. If the matched rule indicates that the data packet is to be denied, then the packet is deleted from the buffer 206 and is thus not allowed to pass to the internal network 102. It is noted that although the rules are applied in sequential order, they will not necessarily be stored internally in data memory 220 in that sequential order. For various reasons, the internal representation of the rules may be different from the logical representation shown in FIG. 4. However, regardless of the internal representation, each rule will be associated with a sequence number or other indication of order of evaluation (e.g. priority), such that the filter module 214 will apply the rules to a received data packet in a given sequence.

As the number of stored rules 222 increases, the performance of the firewall 104 generally degrades because it takes longer to apply the rules to each incoming data packet. The present invention solves this performance problem by re-ordering the stored rules 222 such that rules which are more likely to match incoming data packets are placed earlier in the sequential order (i.e. assigned a lower sequence number). This improves the performance of the firewall because once a rule is matched, the remaining rules are not applied, thus avoiding the processing time required to apply those remaining rules. If rules which are more likely to match data packets can be moved earlier in the rules sequence, performance of the firewall will improve.

However, prior to re-ordering the rules, it must be determined which rules may be re-ordered without having an affect on the overall security policy of the firewall 104. Due to the nature of the rules and the sequential application of the rules to received data packets, certain re-orderings may result in a change in the overall security policy. Such re-orderings must be prevented. For example, referring to the example rule set of FIG. 4, rule number 4 could not be swapped with rule 1, because such a swap will result in rule number 4 being applied first. Since rule number 4 indicates that all data packets are to be denied, placing it first in the rules sequence would result in all data packets being denied. None of the other rules would be reached to allow the data packets to pass. Therefore, it is necessary to determine which rules may be re-ordered while still maintaining the security policy of the firewall.

In order to determine which rules may be re-ordered, conflict module 218 is executed by processor 202. The conflict module analyzes the rule set 222 to determine whether pairs of rules are in conflict such that the swapping of the pair would result in a change in the security policy. Generally, two rules are said to conflict with each other if at least one data packet could match either one of the rules and the actions of the rules are not the same. In the embodiment described herein, the conflict algorithm to determine whether a Rule-A conflicts with a Rule-B is as follows:

---

If ACTION of Rule-A is not the same as ACTION of Rule-B then
  if the PROTOCOL of Rule-A does not intersect with the
  PROTOCOL OF Rule-B then
    if the SOURCE ADDRESS of Rule-A does not intersect
    with the SOURCE ADDRESS of Rule-B then
      if the DESTINATION ADDRESS of Rule-A does not
      intersect with the DESTINATION ADDRESS of Rule-B
      then
        if the SOURCE PORT of Rule-A does not
        intersect with the SOURCE PORT of Rule-B
        then
          if the DESTINATION PORT of Rule-A
          does not intersect with the
          DESTINATION PORT of Rule-B then
            no conflict between Rule-A and
            Rule-B
          else
        else
      else
    else
  else
    conflict between Rule-A and Rule-B.
else
  no conflict.

---

In accordance with the algorithm, a particular field of a rule is said to intersect with a particular field of another rule if there is any intersection in the range of values of the two fields. For example, with respect to fields which contains IP addresses, the fields will intersect if there is any overlap between the addresses. For example, an IP address field containing the address range 123.30.20.50–123.30.20.100 intersects with an IP address field containing the address range 123.30.20.70–123.30.20.150 in the address range 123.30.20.70–123.30.20.100. For example, the IP address 123.30.20.85 would fall within both ranges. Thus, in accordance with the algorithm, if the actions of two rules are different, and if the there is an intersection in any of the fields of the two rules, then the rules conflict. Otherwise, the rules do not conflict. Of course, one skilled in the art could modify the above algorithm in order to detect the conflict between rules with a different set of fields. Such an algorithm would analyze each field of each rule to determine if there were an intersection. If there is any intersection, and if the action of the two rules is different, then the rules conflict.

It is noted that the conflict module 218 is executed once when the rule set 222 changes (i.e. a rule is added or deleted). The results of the execution of the conflict module 218 are stored in data memory 220 as conflict data 226 which indicates, for every possible pair of rules, whether that pair conflicts. In one embodiment, a two-dimensional conflict table such as conflict table 500 shown in FIG. 5 could be stored as conflict data 226 as a result of the execution of conflict module 218. For each pair of rules, the intersection point in the conflict table 500 indicates whether the rules are in conflict (C) or not in conflict (NC). For example, the intersection of row 3 and column 2 in conflict table 500 contains NC indicating that rule 3 and rule 2 do not conflict. If a rule is added, only the interaction of the new rule with the other rules needs to be checked with the conflict module 218. The interaction of the other rules will not change. It is noted that the conflict table 500 is symmetrical in that the intersection of column x and row y will contain the same value as the intersection of column y and row x. As such, only half of the table needs to be stored in conflict data 226 in data memory 220. However, the entire table is shown in FIG. 5 for purposes of this description.

Returning now to the re-ordering of rules, as was stated above, in accordance with the invention, the performance of a packet data filter is improved by re-ordering the stored rules 222 such that rules which are more likely to match incoming data packets are placed earlier in the sequential order. In accordance with one aspect of the invention, the decision as to which rules are more likely to match incoming data packets is made with reference to past history of the firewall 104. In one embodiment, this past history is a record of the number of times each rule has matched an incoming data packet. In accordance with this embodiment, during operation of the firewall 104, an activity module 216 dynamically maintains a running count of the number of times each rule matched an incoming packet. This count is stored as a table in the history section 224 of data memory 220. The table associates a count with each rule. Thus, rules associated with higher counts matched incoming packets more often than rules associated with lower counts. It is noted that the counts can periodically be reinitialized to zero.

The re-ordering of the rule set 222 may be performed periodically (e.g. every 30 minutes), may be initiated by a system administrator, or may be initiated by the firewall 104 based on certain operating parameters of the firewall 104. For example, the firewall 104 may initiate a re-ordering when the performance of the firewall 104 drops below a certain predetermined threshold. The re-ordering is performed by the re-order module 212 by swapping rules having a lower count in history section 224 with rules having a higher count in history section 224. This results in rules which matched data packets more often being placed earlier in the sequential ordering.

One algorithm for swapping rules is as follows.

```
For i = 1 to N
    J = N
    While J > 0
        If match count for Rule J > match count for Rule J-1
        then
            if Rule J does not conflict with Rule J-1 then
                Swap Rule J with Rule J-1.
        J = J - 1.
```

This algorithm attempts to move the rules with a higher match count earlier in the sequence of rules. One constraint of the re-ordering of rules is that rules are only swapped if doing so will not change the overall security policy of the rule set (i.e. the rules do not conflict). While this algorithm uses a well known bubble sort type of algorithm, one skilled in the art could readily implement various types of re-ordering algorithms.

One benefit of the present invention is that the filter rules are re-ordered based on the activity of the firewall. As such, the firewall is dynamically adaptable to changing operating conditions. As an example, one type of attack on a computer system is known as a denial of service attack, which is aimed at reducing the availability of network elements. One technique for mounting such an attack is to continuously transmit packets to a network, which packets are known to be blocked by the network's firewall. If the rule which rejects such packets is late in the sequential ordering of rules, then every time such a packet is received by the firewall, the firewall must apply many rules before rejecting the packet. For example, if the rule which will eventually reject the data packet is rule number 100, then each time such a packet is received, the firewall must apply 100 rules prior to rejecting the packet. By sending many such packets, an attacker may seriously impair the performance of the firewall.

The present invention can improve the performance during a denial of service attack as follows. If an attacker is continuously sending packets which are rejected by rule number 100, then the match count for rule number 100 will increase quickly. Further, since one of the parameters for initiating a re-ordering of rules is the performance of the firewall, then a denial of service attack will substantially degrade the performance such that a re-ordering will be initiated. At such time, since the match count of rule 100 will be high, the re-ordering module will attempt to move rule 100 earlier in the sequential ordering. For example, if the rule were moved to rule 5, then further receipt of the attacking packets will result in the packets being blocked after only 5 rules, rather than 100, an improvement of 95%.

It is to be understood that although the invention has been described in the context of a firewall implemented in a network as shown in FIG. 1, the principles of the present invention may also be implemented in a personal computer configured to filter data packets received from a data network. In one well known configuration, a personal computer is connected to the Internet using a modem and a dial-up connection to the Internet via the telephone network. Since it is often desirable to limit the Internet sites which a user of a personal computer may access, there are various filter programs available which filter incoming data packets based on filtering rules. The principles of the present invention may be implemented in such a personal computer. Such an embodiment of the invention is shown in FIG. 6 as personal computer 600. Personal computer 600 includes a processor 610 connected to a modem 612 which is used to establish a connection to a data network, such as the Internet. In one embodiment, the computer 600 executes a browser program 604 which allows the computer 600 to communicate with World Wide Web (WWW) sites and to receive information from such sites. In accordance with the invention, the computer 600 also includes a packet filter program module 606, which contains a re-order module, filter module, activity module, and intersection module, which operate to implement a packet filter as described above. Also, the computer 600 contains data memory 608 including rules, history, and conflict data, also as described above. A user of the computer 600 interacts with the computer 600 via keyboard 614, graphical input device 618 (e.g. mouse), and display 616 in a conventional manner. In operation, a user of computer 600 may request information from the Internet, and the packet filter module 606 will operate as described above in order to filter data packets in accordance with stored filter rules. The filter rules may be re-ordered to improve the performance of the packet filter, as long as such re-ordering does not change the overall security policy of computer 600.

It is noted that network routers may optionally be configured to filter data packets in a manner similar to that described above in connection with firewalls. Thus, the principles of the present invention may be implemented in a network router which is configured for data packet filtering.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for operation of a data packet filter which implements a security policy by filtering data packets by sequentially evaluating a plurality of ordered rules, said method comprising the step of:

dynamically maintaining, during operation of said data packet filter, match data indicating the number of times each of said rules is matched by a data packet; and automatically re-ordering said ordered rules such that rules which are matched more often are evaluated earlier.

2. The method of claim 1 wherein said step of re-ordering is based on prior activity of said data packet filter.

3. The method of claim 2 further comprising the step of:

dynamically maintaining, during operation of said data packet filter, match data indicating the number of times each of said rules is matched by a data packet; and wherein said step of re-ordering is based on said match data.

4. The method of claim 3 wherein said rules are re-ordered such that rules which are matched more often are evaluated earlier.

5. The method of claim 1 wherein said step of automatically re-ordering is performed periodically.

6. The method of claim 1 wherein said step of automatically re-ordering is performed when the performance of said data packet filter falls below a threshold.

7. The method of claim 1 wherein said step of re-ordering is performed by swapping pairs of rules, said method further comprising the step of:

determining pairs of rules which can be swapped without changing said security policy.

8. The method of claim 7 wherein said step of reordering is performed such that said security policy is not changed.

9. The method of claim 7 wherein said step of determining further comprises the step of determining the intersection of fields of pairs of said rules.

10. A data packet filter for implementing a security policy comprising:

a memory for storing a plurality of ordered rules and match data indicating the number of times each of said rules is matched by a data packet;

a filter module for sequentially applying said rules to received data packets; and a re-ordering module for re-ordering said ordered rules such that rules which are matched more often are evaluated earlier.

11. The data packet filter of claim 10 wherein said memory further stores information representing past activity of said data packet filter and wherein said re-ordering is based on said past activity.

12. The data packet filter of claim 11 wherein said information representing past activity comprises match data indicating the number of times each of said rules is matched by a data packet.

13. The data packet filter of claim 12 further comprising:

an activity module for dynamically maintaining said match data.

14. The data packet filter of claim 10 further comprising:

a conflict module for determining pairs of said rules which can be swapped without altering said security policy.

15. The data packet filter of claim 14 wherein said re-ordering module only swaps pairs of rules which can be swapped without altering said security.

16. The data packet filter of claim 14 wherein said conflict module determines pairs of said rules which can be swapped without altering said security policy by determining the intersection of fields of pairs of rules.

17. A computer readable medium storing computer program instructions which are executable on a computer system implementing a data packet filter, said computer program instructions comprising instructions defining the steps of:

filtering received data packets by sequentially applying a plurality of ordered rules, said rules defining a security policy;

dynamically maintaining, during operation of said computer system, match data indicating the number of times each of said rules is matched by a data packet; and automatically re-ordering said ordered rules such that rules which are matched more often are applied earlier.

18. The computer readable medium of claim 17 wherein said computer program instructions further comprise instructions defining the steps of:

re-ordering said rules based on prior activity of said computer system.

19. The computer readable medium of claim 18 wherein said computer program instructions further comprise instructions defining the steps of:

dynamically maintaining, during operation of said computer system, match data indicating the number of times each of said rules is matched by a data packet; and re-ordering said rules based on said match data.

20. The computer readable medium of claim 19 wherein said computer program instructions further comprise instructions defining the steps of:

re-ordering said rules such that rules which are matched more often are applied earlier.

21. The computer readable medium of claim 17 wherein said computer program instructions further comprise instructions defining the step of:

periodically automatically re-ordering said rules.

22. The computer readable medium of claim 17 wherein said computer program instructions further comprise instructions defining the step of:

automatically re-ordering said rules when the performance of said computer system falls below a threshold.

23. The computer readable medium of claim 17 wherein said computer program instructions further comprise instructions defining the step of:

determining pairs of rules which can be swapped without changing said security policy.

24. The computer readable medium of claim 23 wherein said computer program instructions further comprise instructions defining the step of:

re-ordering said rules by swapping only those rules which may be swapped without changing said security policy.

25. The computer readable medium of claim 23 wherein said computer program instructions further comprise instructions defining the step of:
  determining pairs of said rules which can be swapped without changing said security policy by determining the intersection of fields of pairs of rules.

26. A firewall for filtering data traffic between a first network and a second network comprising:
  an input port for receiving data packets;
  a memory storing a plurality of ordered rules defining a security policy of said firewall;
  a filter module for sequentially applying said ordered rules to received data packets;
  an activity module for dynamically maintaining match data indicating the number of times each of said rules is matched by a data packet; and
  a re-order module for automatically re-ordering said plurality of rules such that rules which are matched more often are evaluated earlier.

27. The firewall of claim 26 further comprising:
  a conflict module for determining whether pairs of rules can be swapped without altering said security policy.

28. The firewall of claim 27 wherein said conflict module determines whether pairs of rules can be swapped without altering said security policy by determining the intersection of fields of pairs of rules.

29. The firewall of claim 27 wherein said re-order module only swaps pairs of rules which can be swapped without altering said security policy.

30. The firewall of claim 26 further comprising an activity module for dynamically maintaining activity information about the operation of said firewall.

31. The firewall of claim 30 wherein said activity information comprises match data indicating the number of times each of said rules is matched by a data packet.

32. The firewall of claim 30 wherein said re-order module re-orders said plurality of rules based on said activity information.

33. An apparatus for filtering data packets received from a network in accordance with a security policy, said apparatus comprising:
  storage means for storing a plurality of rules in an order, said rules and said order defining said security policy;
  filter means for sequentially applying said rules in said order to received data packets;
  means for dynamically maintaining data indicating the number of times each of said rules is matched by a data packet; and
  re-ordering means for automatically re-ordering said plurality of ordered rules such that rules which are matched more often are placed earlier in said order.

34. The apparatus of claim 33 wherein said re-ordering means further comprises means for re-ordering said plurality of ordered rules based on prior activity of said apparatus.

35. The apparatus of claim 33 further comprising:
  means for dynamically maintaining data indicating the number of times each of said rules is matched by a data packet.

36. The apparatus of claim 35 wherein said re-ordering means further comprises means for re-ordering such that rules which are matched more often are placed earlier in said order.

37. The apparatus of claim 33 further comprising conflict means for determining rules which may be re-ordered without changing said security policy.

38. The apparatus of claim 37 wherein said conflict means further comprises means for determining an intersection between fields of said rules.

39. The apparatus of claim 37 wherein said re-order means further comprises means for re-ordering said rules to maintain said security policy.

* * * * *